United States Patent
Gottsman

(10) Patent No.: US 8,214,300 B2
(45) Date of Patent: Jul. 3, 2012

(54) SOCIAL NETWORK METHOD AND APPARATUS

(75) Inventor: Edward J. Gottsman, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 254 days.

(21) Appl. No.: 12/211,328

(22) Filed: Sep. 16, 2008

(65) Prior Publication Data

US 2010/0070499 A1   Mar. 18, 2010

(51) Int. Cl.
*G06Q 99/00* (2006.01)
(52) U.S. Cl. .................................................. 705/319
(58) Field of Classification Search .................. 705/319
See application file for complete search history.

(56) References Cited

U.S. PATENT DOCUMENTS

| | | | |
|---|---|---|---|
| 7,216,088 B1 * | 5/2007 | Chappel et al. ............... | 705/11 |
| 7,249,123 B2 | 7/2007 | Elder et al. | |
| 7,292,990 B2 * | 11/2007 | Hughes ........................... | 705/9 |
| 2007/0033166 A1 * | 2/2007 | Trowbridge et al. ........... | 707/3 |

OTHER PUBLICATIONS

"Social Network", Wikipedia, http://en.wikipedia.org/wiki/social_network; Aug. 11, 2008.
"LinkedIn", Wikipedia, http://en.wikipedia.org/wiki/LinkedIn Aug. 11, 2008.

* cited by examiner

*Primary Examiner* — Traci L Casler
*Assistant Examiner* — Maame Ofori-Awuah
(74) *Attorney, Agent, or Firm* — Vedder Price PC

(57) ABSTRACT

A social networking apparatus includes a first project involvement module, a second project involvement module, and a relationship determination module. The first project involvement module determines a first degree of involvement with a project for a first person. The second project involvement module determines a second degree of involvement with the project for a second person. The relationship determination module determines a social relationship between the first and second person based on the first and second degree of involvement. A combined project involvement module may also determine a combined degree of involvement that takes into account the contributions of substantially all project participants, which combined degree of involvement may be further employed when determining the social relationship. In this manner, social relationships may be determined in a more efficient manner.

12 Claims, 4 Drawing Sheets

US 8,214,300 B2

SOCIAL NETWORK METHOD AND APPARATUS

FIELD

The present disclosure generally relates to social networks, and more particularly, to methods and apparatus for identifying social networks.

BACKGROUND

Social network analysis provides a way of looking at interactions between people. By analyzing the interactions, it can become possible to quickly find experts who might be able to answer questions and to find people to serve as intermediaries (e.g., bridges) between different people and/or organizations.

One drawback of social network analysis is the difficulty in determining social connections between people. For example, one method uses personal interviews to determine social connections, which can be rather time consuming and too slow to implement given the dynamic nature of social networks.

Accordingly, there is a need to provide an improved method and apparatus to determine social connections between people in a more time efficient manner.

BRIEF DESCRIPTION OF THE DRAWINGS

The disclosure will be more readily understood in view of the following description when accompanied by the below figures, wherein like reference numerals represent like elements.

SUMMARY

Figure 1:
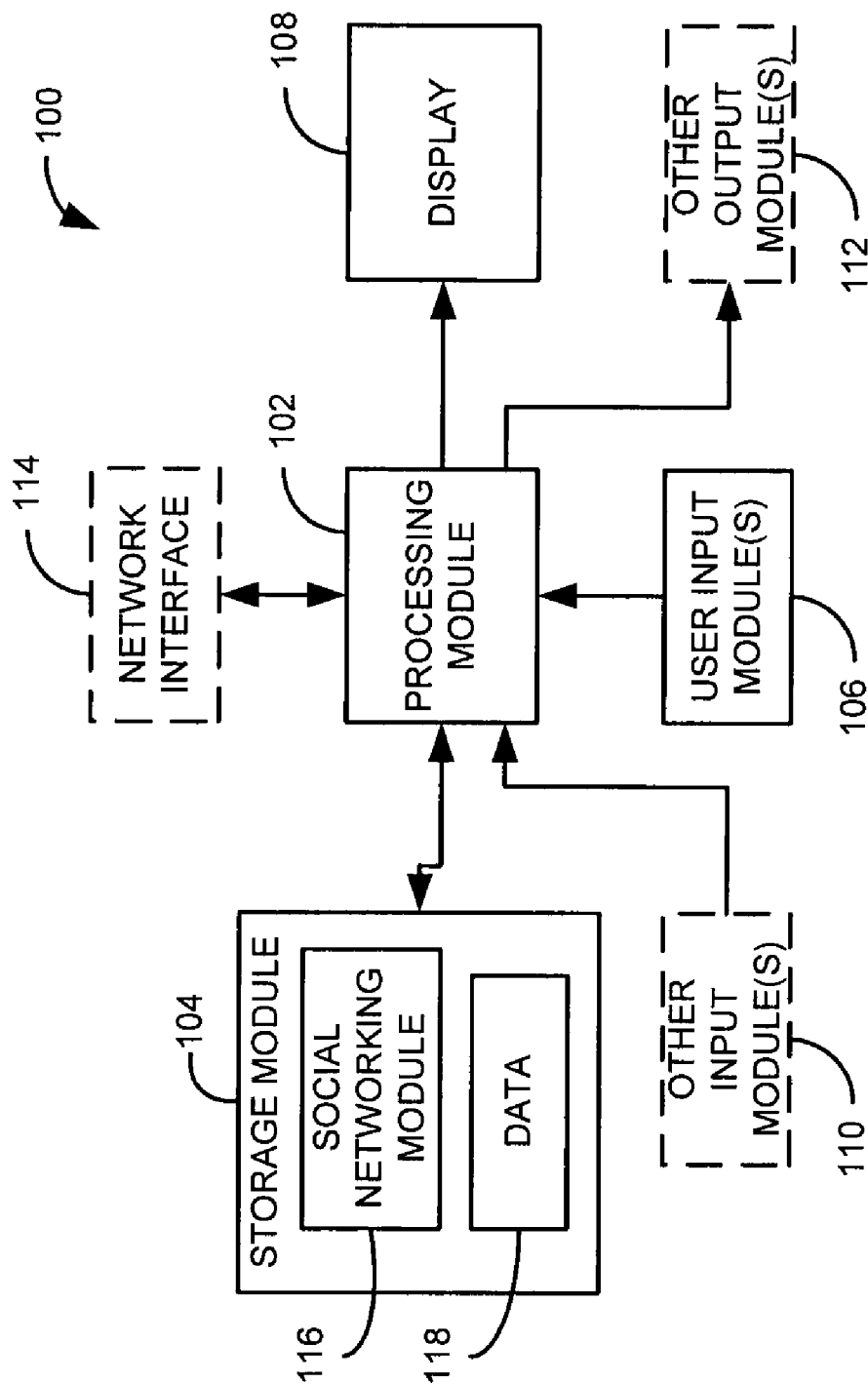
FIG. 1 is a block diagram of an exemplary device that may be used to implement processing in accordance with various embodiments of the present disclosure.

The instant disclosure describes a method and apparatus for determining social connections between people in a time efficient manner that overcomes the limitations of prior art techniques. In one example, a social networking apparatus includes a first project involvement module, a second project involvement module, and a relationship determination module. The first project involvement module determines a first degree of involvement with a project for a first person. The second project involvement module determines a second degree of involvement with the project for a second person. The relationship determination module determines a social relationship (e.g., the connection strength or likelihood of the existence of a suitable social connection between the two persons) between the first and second person based at least on the first and second degree of involvement. Intuitively, increasing first and/or second degrees of involvement with a project correspond to increasing likelihood that the two persons know one another. In one embodiment, the relationship determination module may determine a social relationship by comparing a score (based on the degrees of involvement) to one or more predetermined values. When the score value transcends the predetermined value(s), varying degrees of a social relationship may be inferred.

To further refine the determination of connection strength between two persons, the social networking apparatus may also include a combined project involvement module. The combined project involvement module determines a combined degree of involvement with the project for both the first and second person normalized by the overall size of the project as expressed, in one embodiment, by the number of hours worked by substantially all contributors to the project. In this manner, the combined degree of involvement discounts the connection strength between two persons as the overall size of the project increases, thereby capturing the intuition that two people are less likely to know each other as the size of, or number of contributors to, a project increases.

In one embodiment, the various degrees of involvement may be based on the effort contributed to the project, expressed as the number of hours devoted to the project, by the persons under consideration. Thus, in a particular implementation, the first degree of involvement may be based on a first effort by the first person during a standardized period of time, whereas the second degree of involvement may be based on a second effort by the second person during the standardized period. The first and second efforts may be normalized by the number of hours in the standardized period. In this same vein, the combined degree of involvement may be based on the combination of the first and second efforts normalized by the number of hours devoted by substantially all contributors to the project during the standardized period.

In addition to the disclosed apparatus, related methods are also described herein. The apparatus and method assists in identifying social connections between people in an automated manner, which is more time efficient than conventional techniques. As such, the apparatus and method are more suitable for identifying social connections in dynamic social networks than conventional techniques. Furthermore, by determining social connections between a plurality of persons, a social network can be identified in order to find experts who might be able to answer particular questions and/or people who might be willing to serve as intermediaries (e.g., bridges) between different people and/or organizations. Other advantages will be recognized by those of ordinary skill in the art.

DETAILED DESCRIPTION

As used herein, the term "module" can include an electronic circuit, one or more processors (e.g., shared, dedicated, or group of processors such as but not limited to microprocessors, digital signal processors, or central processing units) and memory, that execute one or more software or firmware programs, combinational logic circuits, an application specific integrated circuit (ASIC), and/or other suitable components that provide the described functionality.

Referring now to FIG. 1, an exemplary processing device 100 that can be used in accordance with the present disclosure is depicted. In one embodiment, the device 100 may comprise a suitable server computer; desktop, laptop or handheld computer or the like. Regardless of its particular implementation, the device 100 includes a processing module 102 operatively coupled to a storage module 104. The storage module 104 includes a social networking module 116 and data 118, both described in further detail below. The processing module 102 can include one or more processing devices such as a microprocessor, microcontroller, digital signal processor or combinations thereof capable of executing instructions associated with the social networking module 116 and operating upon the stored data 118. Likewise, the storage module 104 can include one or more storage devices such as volatile or nonvolatile memory including random access memory (RAM), read-only memory (ROM), electrically-erasable programmable read-only memory (EEPROM), and/or other suitable storage devices. Those having ordinary skill in the art will appreciate that various other suitable arrangements of the processing module 102 and storage module 104 may be readily devised in accordance with the present disclosure.

In one embodiment, the device 100 can include one or more user input module(s) 106, a display 108, other input module(s) 110, other output module(s) 112 and/or a network interface module 114, each in communication with the processing module 102. The user input module(s) 106 can be any known mechanism for providing user input to the processing module 102. For example, the user input module(s) 106 can include a keyboard, a mouse, a touch screen, stylus and/or any other suitable means known to those having ordinary skill in the art whereby a user of the device 100 may provide input data to the processing module 102. The display 108 can include any conventional display mechanism such as a cathode ray tube (CRT), a flat panel display, a liquid crystal (LCD) display, a light emitting diode (LED) display, plasma display, and/or any other suitable display mechanism known to those having ordinary skill in the art. Techniques for providing display data from the processing module 102 to the display 108 are well known in the art.

The other (optional, as illustrated by the dashed lines) input module(s) 110 can include various media drives (such as magnetic disc or optical disc drives), a microphone or any other source of input data or selection indications. Likewise, the other output module(s) 112 can optionally include similar media drive mechanisms as well as other devices capable of providing information to a user of the device 100, such as speakers, LEDs, tactile outputs, and other suitable devices.

The network interface module 114 can include hardware and/or software that allows the processing module 102 to communicate with other devices via a wired and/or wireless network, as known in the art. Using the network interface module 114, the techniques of the present invention may be performed in a remote manner, for example, as in the case of a Web application service.

Figure 2:
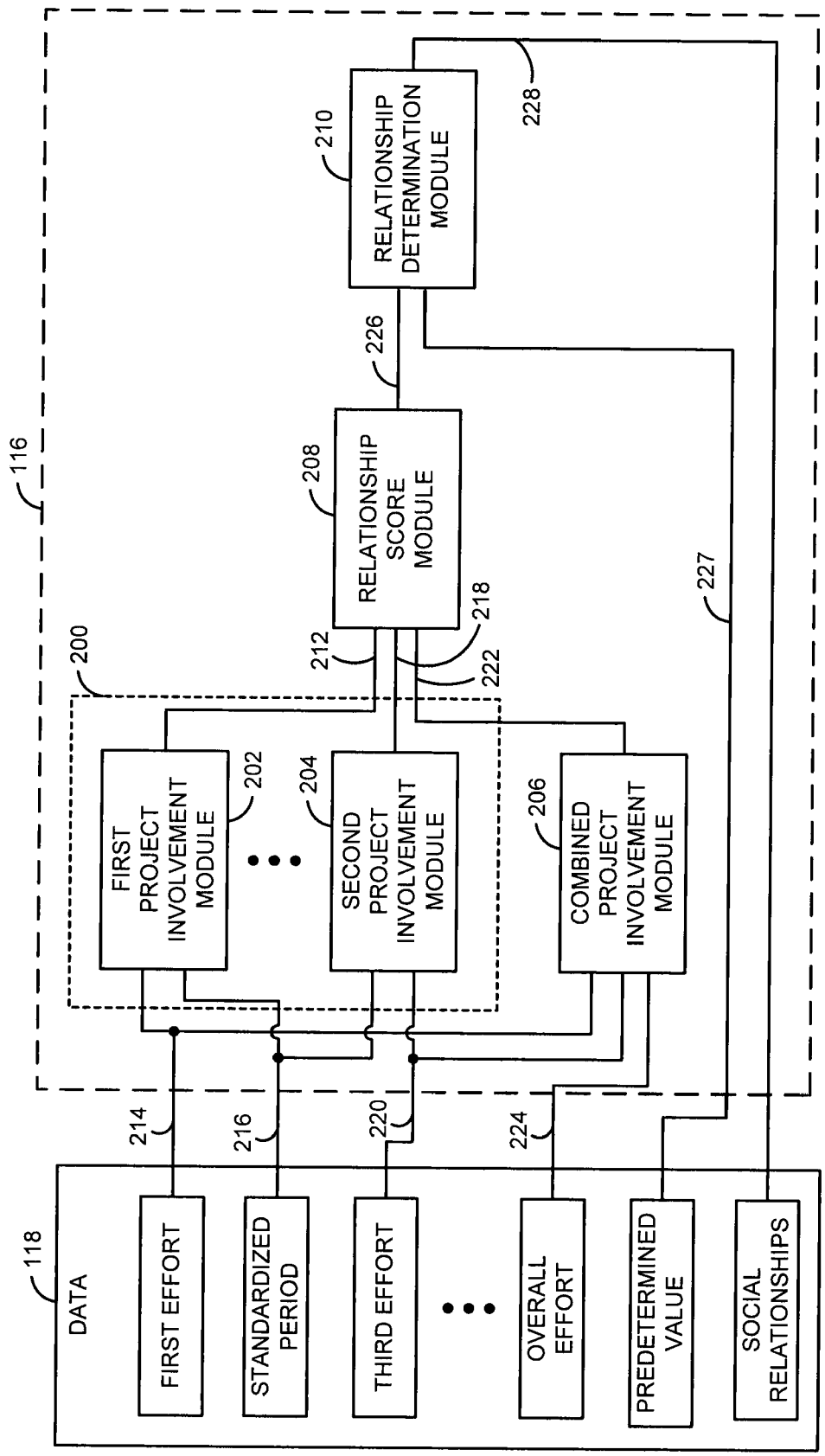
FIG. 2 is an exemplary block diagram of a social networking apparatus.

Referring now to FIG. 2, an exemplary functional block diagram of the social networking module 116 is depicted. The social networking module 116 includes one or more project involvement modules 200. In this example, the social networking module 116 includes a first project involvement module 202 and a second project involvement module 204 although it is understood that more or less project involvement modules can be used if desired, or that the functionality of multiple involvement modules can be combined into a single module (or, at least, a lesser number of modules) such that processing is performed serially rather than in parallel as shown. The social networking module 116 also includes a combined project involvement module 206, a relationship score module 208, and a relationship determination module 210. The relationship score module 208 is operatively coupled to the one or more project involvement modules 200, the combined project involvement module 206, and the relationship determination module 210.

As used herein, a project comprises any endeavor to which two or more persons have contributed such that their level of involvement can be tracked from measurable data. For example, in a business context, a project may be represented by a billing code associated with that project and that is used by project participants to track the number of hours spent working on the project. Other examples of suitable representations of a project and the level of involvement of individuals in such projects will be apparent to those having ordinary skill in the art and may be readily incorporated into the techniques described below for determining a person's level of involvement in a project. Regardless, one or more projects and a persons' involvement therewith serve, in accordance with the instant disclosure, as a medium for determining the relative strength of social connections between such persons.

The first project involvement module 202 determines a first degree of involvement 212 with a project for a first person based on the data 118. For example, in one embodiment, the first project involvement module 202 determines how much involvement the first person has with the project based on a ratio of a first effort 214 to a standardized period 216. The first effort 214 represents how much time the first person spent working on the project, e.g., how much time the first person billed to the project (as determined, for instance, by the appropriate billing code) during the standardized period. The standardized period 216 represents a typical length of time used to measure a number of hours worked on a project such as, for example, a pay period (e.g., 40 hours), a billing period (e.g., how often a client is billed for the project), or other suitable period. In this embodiment, then, the first degree of involvement is a normalized assessment of the first person's effort with respect to the project during the standardized period 216.

In a similar manner, the second involvement module 204 determines a second degree of involvement 218 with the project for a second person based on the data 118. Continuing the example described above, the second project involvement module 204 determines how much involvement the second person has with the project based on a ratio of a second effort 220 to the standardized period 216. The third period 220 represents how much time the second person spent working on the project, e.g., how much time the second person billed to the project (again, as determined by the appropriate billing code) during the standardized period. Thus, the second degree of involvement, in this particular embodiment, is similarly a normalized assessment of the second person's effort with respect to the project during the standardized period 216.

The combined project involvement module 206 determines a combined degree of involvement 222 with the project for the first person and the second person based on the data 118. While the first and second degrees of involvement capture the intuition that common involvement with a project correlates to likelihood of a relationship between two people, the combined degree of involvement expresses the countervailing intuition that two persons are less likely to have a relationship as the overall size of a project increases. To the extent that, as described in further detail below, the various degrees of involvement are used to numerically assess a connection strength between two people, the combined degree of involvement 222 may be expressed in a manner that reduces the connection strength as necessary. For example, as further described below, the combined project involvement module 206 can determines the combined degree of involvement 222 based on a combination of the first and second efforts 214, 220 normalized by an overall effort 224. The overall effort 224 can represent how much total time the project has been worked on as a whole (e.g., by substantially all persons involved in the project) during the standardized period 216. By normalizing the combination of the first and second efforts 214, 220 in this manner, the resulting combined degree of involvement 222 will be a value between 0 and 1, which may be used multiplicatively to appropriately reduce the connection strength.

The relationship score module 208 determines a score value 226 in response to the first degree of involvement 212 and the second degree of involvement 218. Additionally, as noted above, the combined degree of involvement 222 may also be incorporated into the determination of the score value 226. The score value 226 represents a degree of relation (e.g., a connection strength) between the first and second person. In one embodiment, the score value 226 can vary between zero and one, although other ranges are contemplated. As such, if the score value 226 is substantially zero, a relationship between the first and second person probably does not exist. Likewise, if the score value 226 is substantially one, a strong relationship likely exists between the first and second person. Furthermore, if the score value 226 is between zero and one, such as 0.5 for example, the first and second person probably know each other, but perhaps not as well as if the score were closer to one.

In one embodiment, the score value 226 can be based on a product of the first degree of involvement 212, the second degree of involvement 218, and the combined degree of involvement 222. As such, the score value 226 can be determined with the following equation:

$$s = i_1 \times i_2 \times i_c \quad \text{Eq. 1}$$

where s represents the score value 226 (e.g., connection strength between the first and second person), $i_1$ represents the first degree of involvement 212 with the project for the first person, $i_2$ represents the second degree of involvement 218 with the project for the second person, and $i_c$ represents the combined degree of involvement 222 with the project for the first person and the second person. Note that the score value 226 determined according to claim 1, when based on the data 118 illustrated in FIG. 2, is relative to a single standardized period 216.

In some embodiments, the score value 226 can be determined over a number of standardized periods 216. Extending Equation 1 in this manner, the score value 224 can be determined as shown in Equation 2:

$$s = \sum_{j=1}^{n} i_{1,j} \times i_{2,j} \times i_{c,j} \quad \text{Eq. 2}$$

where n represents a number of standardized periods and $i_{1,j}$, $i_{2,j}$ and $i_{c,j}$ represent the various degrees of involvement 212, 218, 222 for the j'th standardized period. In this manner, a more reliable assessment is obtained to the extent that the data spans multiple standardized periods.

As noted above, in one embodiment, the first degree of involvement 212 can be based on a ratio between the first effort 214 (e.g., how much time the first person spent working on the project) and the standardized period 216. The second degree of involvement 218 can be based on a ratio between the second effort 220 (e.g., how much time the second person spent working on the project) and the standardized period 216. The combined degree of involvement 222 can be based on a ratio of a sum of the first and second efforts 214, 220 and the overall effort 224. In this case, and building upon the multi-standardized period approach of Equation 2, the score value 224 can be determined according to Equation 3:

$$s = \sum_{j=1}^{n} \frac{h_{1,j}}{h_s} \times \frac{h_{2,j}}{h_s} \times \frac{h_{1,j} + h_{2,j}}{h_{t,j}} \quad \text{Eq. 3}$$

where $h_{1,j}$ and $h_{2,j}$ represent the first and second efforts 214, 220 expressed as numbers of hours billed by the first and second persons to a project during the j'th standardized period, $h_s$ represents the standardized period 216 and $h_{t,j}$ represents the overall effort 224 expressed as the number of hours billed overall by substantially all project participants during the j'th standardized period. Accordingly, in this embodiment, the first degree of involvement 212 (i.e., $i_1$) is represented by $h_{1,j}/h_s$, the second degree of involvement 218 is represented by $h_{2,j}/h_s$, and the third degree of involvement 222 is represented by $h_{1,j}+h_{2,j}/h_{t,j}$. Given the ratios expressed in Eq. 3, it is evident that increased efforts 214, 220 by the first and second persons relative to the project increases the score value 226. Oppositely, as the overall effort 224 increases, the score value 226 decreases.

In addition, in some embodiments, the score value 226 can be based on multiple projects and the degree of involvement that the first and second person has with each project. Once again building upon the previous examples described above, the score value 224 can be determined with the following equation:

$$\sum_{k=1}^{m} \sum_{j=1}^{n} \frac{h_{1,j,k}}{h_s} \times \frac{h_{2,j,k}}{h_s} \times \frac{h_{1,j,k} + h_{2,j,k}}{h_{t,j,k}} \quad \text{Eq. 4}$$

where m represents the number of projects being considered, $h_{1,j,k}$ and $h_{2,j,k}$ represent the first and second efforts 214, 220 expressed as numbers of hours billed by the first and second persons to a k'th project during the j'th standardized period and $h_{t,j,k}$ represents the overall effort 224 expressed as the number of hours billed overall by substantially all project participants on the k'th project during the j'th standardized period. In this manner, the perception that two people working on two or more projects together are likely to have a stronger connection (as discounted, however, by the size of the various projects, as noted above) may be incorporated into the score value.

The relationship determination module 210 determines a social relationship 228 between the first and second person based on the score value 226 and a predetermined value 227. The predetermined value 227 may be a single value chosen to make a threshold decision, i.e., any score values 226 below the predetermined value 227 indicate that no relationship (or, at best, an insufficient relationship) exists, whereas any score values at or above the predetermined value 227 indicate a social relationship exists. Alternatively, the predetermined value 227 may comprise a plurality of values chosen to establish different ranges expressing the likely strength of the social connection between two people. For example, two predetermined values can be employed such that score values 226 below a first predetermined value are categorized as indicating a relatively "weak" social connection, whereas score values 226 above the first predetermined value but below a second predetermined value are categorized as indicating a relatively "moderate" social connection and, finally, score values 226 above the second predetermined value are categorized as indicating a relatively "strong" social connection. Of course, other categorizations in this same manner will be readily apparent to those of skill in the art. Regardless, the social relationship 228 represents whether the first and second person likely know each other and, optionally, the likely strength of such assessment. The resulting social relationship 228 between each person can be stored in as data 118 in the memory module 104 for later use.

For example, the apparatus described above may be used determine the nature and extent of social networks based on the various social relationships 228 determined for a number of people. Based on such identified social networks, it becomes possible to identify experts who might be able to answer particular questions and/or people to serve as intermediaries (e.g., bridges) between different people and/or organizations.

Figure 3:
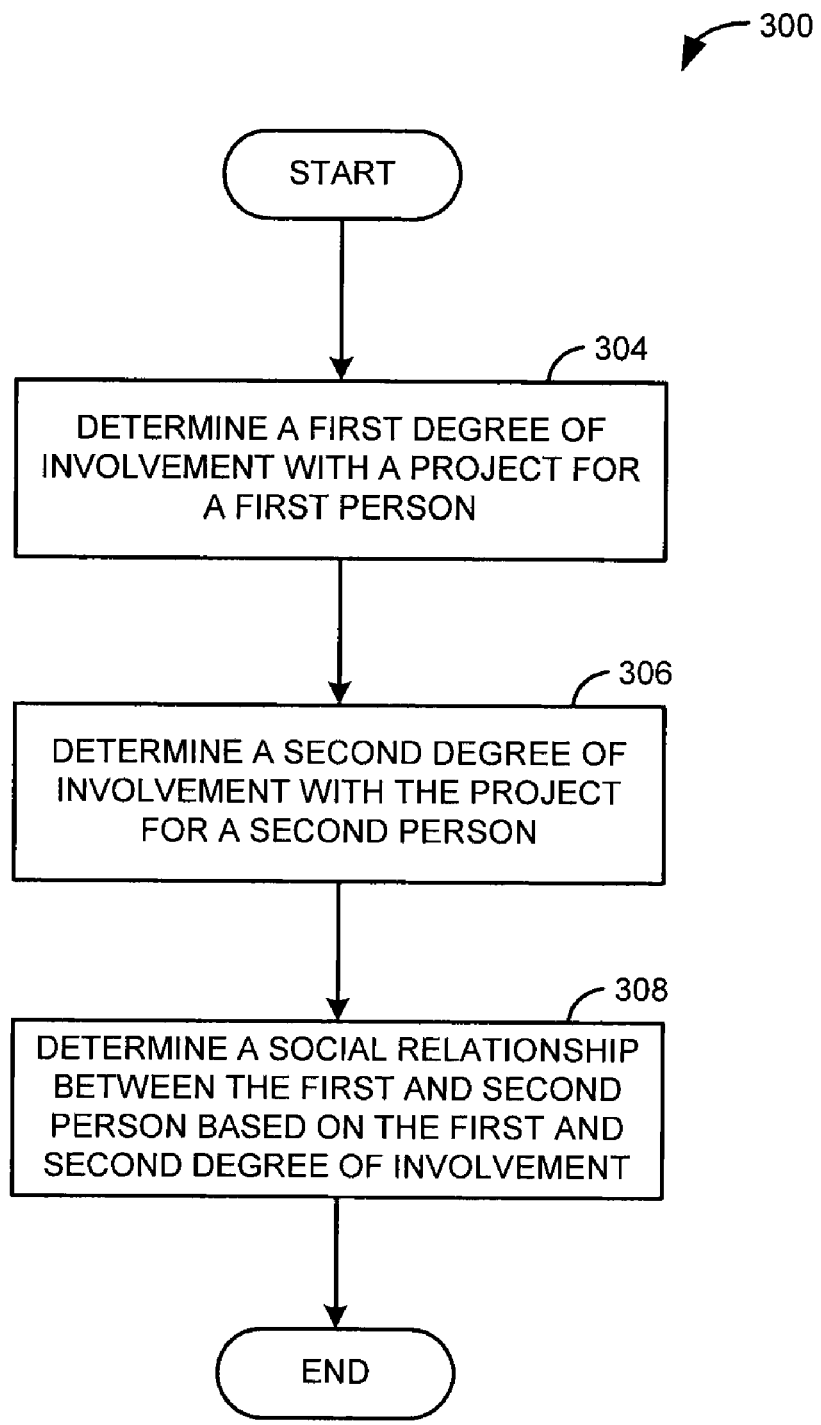
FIG. 3 is a flowchart depicting exemplary operations that can be performed by the social networking apparatus.

Referring now to FIG. 3, exemplary operations that can be performed by the social networking module 116 or other apparatus are generally identified at 300. Beginning at step 304, the first degree of involvement 212 for a first person with a project is determined, for example based on the data 118 as described above. In one embodiment, the first person is identified by a user (or requestor) desiring to determine the extent of social relationships for the first person including, for example, the network of relationships involving the first person. In step 306, the second degree of involvement 218 with the project and a second person is determined, for example based on the data 118 as described above. As before, the second person may be identified by the requester. For example, in one application of the techniques described herein, the first person may be an expert or other person that the requester would like to contact, but with whom the requester has no social relationship. In order to get an introduction to the first person, the requester may specify someone known to the requester as the second person in order to determine whether that second person could serve as an intermediary between the requester and the first person. Regardless of the reason, at step 308, the a social relationship 228 between the first and second person is determined based, for example, on the score value 226 using any of the techniques described above.

As noted above, the process generally identified at 300 can be repeated to determine a plurality of social relationships between a plurality of people in order to determine a social network including expert persons and intermediaries. For example, in one embodiment, the process can be repeated as necessary to determine a first set of social relationships between an expert person and multiple other persons; and a second set of social relationships between the requester and additional other persons. Persons that are included in the first and second set of social relationships, if any, can act as an intermediary between the expert person and the requester. If no such persons are identified in both the first and second set of social relationships, the process can be repeated as needed with those other persons in the first and second set to see if one or more additional "layers" of the social network can identify one more persons establishing the desired link between the requester and expert. If sufficient links are established, the requester can seek to contact the one or more intermediary persons in order to reach the expert person.

Figure 4:
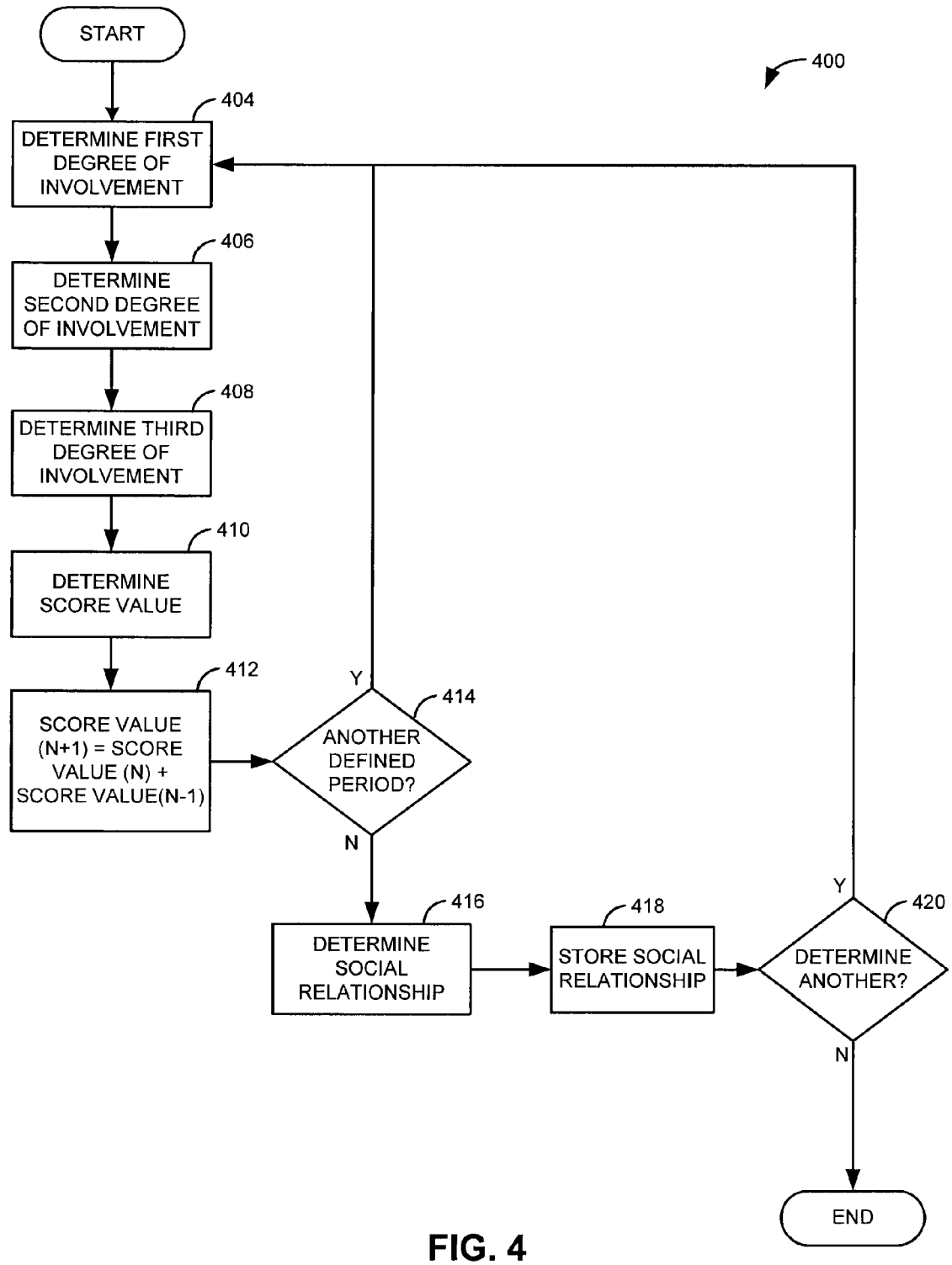
FIG. 4 is a flowchart depicting additional exemplary operations that be performed by the social networking apparatus.

Referring now to FIG. 4, additional exemplary operations that can be performed by the social networking module 116 or other apparatus are generally identified at 400. In particular, the operations illustrated in FIG. 4 are applicable to the case where multiple standardized periods are assessed. Beginning at step 404, the first degree of involvement 212 is determined based on the first effort 214 and a given standardized period 216. Similarly, in step 406, the second degree of involvement 218 is determined based on the second effort 220 and the standardized period 216. Further still, at step 408, the combined degree of involvement 222 is determined based on the first effort 214, the second effort 220, and the overall effort 224 for the standardized period 216. Thereafter, at step 410, a score value 226 based on the first degree of involvement 212, the second degree of involvement 218, and the combined degree of involvement 222 are determined as described above, for example. In step 412, this score value 226 is added to a running total score value, i.e., to the score values 226 previously determined for other standardized periods 216.

In step 414, it is determined whether another standardized period (e.g., pay period, billing period, or other suitable period) needs to be assessed. If so, the process returns to step 404. However, if no further standardized periods need assessment, processing continues at step 416 where the nature of the social relationship between the two people is determined, for example, by comparing the running total score value against the one or more predetermined value 227. The resulting social relationship 228 between the first and second person (which may comprise a binary indication or a more finely-grained categorization, as noted above) is subsequently stored, for example, in the memory module 104 as described above, at step 418. Thereafter, the process proceeds to step 420 where it is determined whether another social relationship between two or more persons is to be assessed. If so, processing continues at step 404 and the above-described process is repeated (after re-initialization of the running total score value). As noted above, by determining a plurality of social relationships between a plurality of persons, a social network can be created in order to find experts who might be able to answer particular questions and/or people to serve as intermediaries (e.g., bridges) between different people and/or organizations.

As noted above, among other advantages, the social networking module 116 provides social connections between people in an automated manner, which is more time efficient than conventional techniques. As such, the apparatus and method are more suitable for providing social connections in dynamic social networks than conventional techniques. Furthermore, by determining social connections between a plurality of persons, the existence of a social network can be identified in order to find experts who might be able to answer particular questions and/or people to serve as intermediaries (e.g., bridges) between different people and/or organizations. Other advantages will be recognized by those of ordinary skill in the art.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:

1. A social networking apparatus, comprising:
    a first project involvement module, implemented by at least one processing device, that is operative to determine a first degree of involvement with a project for a first person;
    a second project involvement module, implemented by the at least one processing device, that is operative to determine, independently of the first degree of involvement, a second degree of involvement with the project for a second person;
    a combined project involvement module, implemented by the at least one processing device, that is operative to determine a combined degree of involvement with the project for the first and second person;
    a relationship score module, implemented by the at least one processing device, that is operative to determine a score based on the first degree of involvement, the second degree of involvement, and the combined degree of involvement; wherein the score, s, is determined by the equation:

$$s = \sum_{j=1}^{n} \frac{h_{1,j}}{h_s} \times \frac{h_{2,j}}{h_s} \times \frac{h_{1,j} + h_{2,j}}{h_{t,j}}$$

where $h_{1,j}$ represents a first effort during a j'th standardized period, $h_{2,j}$ represents a second effort during the j'th standardized period, $h_s$ represents the standardized period and $h_{t,j}$ represents an overall effort by substantially all project participants during the j'th standardized period; and a relationship determination module, implemented by the at least one processing device, that is operative to determine an existence and strength of a social relationship between the first and second person by comparing the score to at least one predetermined value.

2. The social networking apparatus of claim 1 wherein the first degree of involvement is based on the first effort expressed as hours billed to the project by the first person during the standardized period, the second degree of involvement is based on the second effort expressed as hours billed to the project by the second person during the standardized period and the combined degree of involvement is based on the first and second effort and the overall effort expressed as hours billed to the project by substantially all participants in the project during the standardized period.

3. The social networking apparatus of claim 2 wherein the first degree of involvement is based on a ratio between the first effort and the standardized period, the second degree of involvement is based on a ratio between the second effort and the standardized period and the combined degree of involvement is based on a ratio between a sum of the first and second efforts and the overall effort.

4. The social networking apparatus of claim 1 wherein the social relationship is determined based on whether the score value transcends one of the at least one predetermined value.

5. In a processing device, a social networking method comprising:

determining by at least one processing device, a first degree of involvement with a project for a first person;

determining, independently of the first degree of involvement, by the at least one processing device, a second degree of involvement with the project for a second person;

determining by the at least one processing device, a combined degree of involvement with the project for the first and second person;

determining by the at least one processing device, a score, s, determined by the equation:

$$s = \sum_{j=1}^{n} \frac{h_{1,j}}{h_s} \times \frac{h_{2,j}}{h_s} \times \frac{h_{1,j} + h_{2,j}}{h_{t,j}}$$

where $h_{1,j}$ represents a first effort during a j'th standardized period, $h_{2,j}$ represents a second effort during the j'th standardized period, $h_s$ represents the standardized period and $h_{t,j}$ represents an overall effort by substantially all project participants during the j'th standardized period; and determining by the at least one processing device, an existence and strength of a social relationship between the first and second person by comparing the score to at least one predetermined value.

6. The social networking method of claim 5 wherein the first degree of involvement is based on the first effort expressed as hours billed to the project by the first person during a standardized period, the second degree of involvement is based on the second effort expressed as hours billed to the project by the second person during the standardized period and the combined degree of involvement is based on the first and second effort and the overall effort expressed as hours billed to the project by substantially all participants in the project during the standardized period.

7. The social networking method of claim 6 wherein the first degree of involvement is based on a ratio between the first effort and the standardized period, the second degree of involvement is based on a ratio between the second effort and the standardized period and the combined degree of involvement is based on a ratio between a sum of the first and second efforts and the overall effort.

8. The social networking method of claim 5 wherein the social relationship is determined based on whether the score value transcends the predetermined value.

9. A non-transitory computer-readable medium comprising executable instructions that, when executed by at least one processor, cause the at least one processor to:

determine a first degree of involvement with a project for a first person;

determine, independently of the first degree of involvement, a second degree of involvement with the project for a second person;

determine a combined degree of involvement with the project for the first and second person;

determine a score, s, determined by the equation:

$$s = \sum_{j=1}^{n} \frac{h_{1,j}}{h_s} \times \frac{h_{2,j}}{h_s} \times \frac{h_{1,j} + h_{2,j}}{h_{t,j}}$$

where $h_{1,j}$ represents a first effort during a j'th standardized period, $h_{2,j}$ represents a second effort during the j'th standardized period, $h_s$ the standardized period and $h_{t,j}$ represents an overall effort by substantially all project participants during the j'th standardized period; and determine an existence and strength of a social relationship between the first and second person by comparing the score to at least one predetermined value.

10. The non-transitory computer-readable medium of claim 9 wherein the first degree of involvement is based on the first effort expressed as hours billed to the project by the first person during the standardized period, the second degree of involvement is based on the second effort expressed as hours billed to the project by the second person during the standardized period and the combined degree of involvement is based on the first and second effort and the overall effort expressed as hours billed to the project by substantially all participants in the project during the standardized period.

11. The non-transitory computer-readable medium of claim 10 wherein the first degree of involvement is based on a ratio between the first effort and the standardized period, the second degree of involvement is based on a ratio between the second effort and the standardized period and the combined degree of involvement is based on a ratio between a sum of the first and second efforts and the overall effort.

12. The non-transitory computer-readable medium of claim 9 wherein the social relationship is determined based on whether the score value transcends the predetermined value.

* * * * *